Oct. 31, 1933.  L. A. COLMAN  1,933,162
CHASSIS SUPPORT
Filed Dec 14, 1932   2 Sheets-Sheet 1
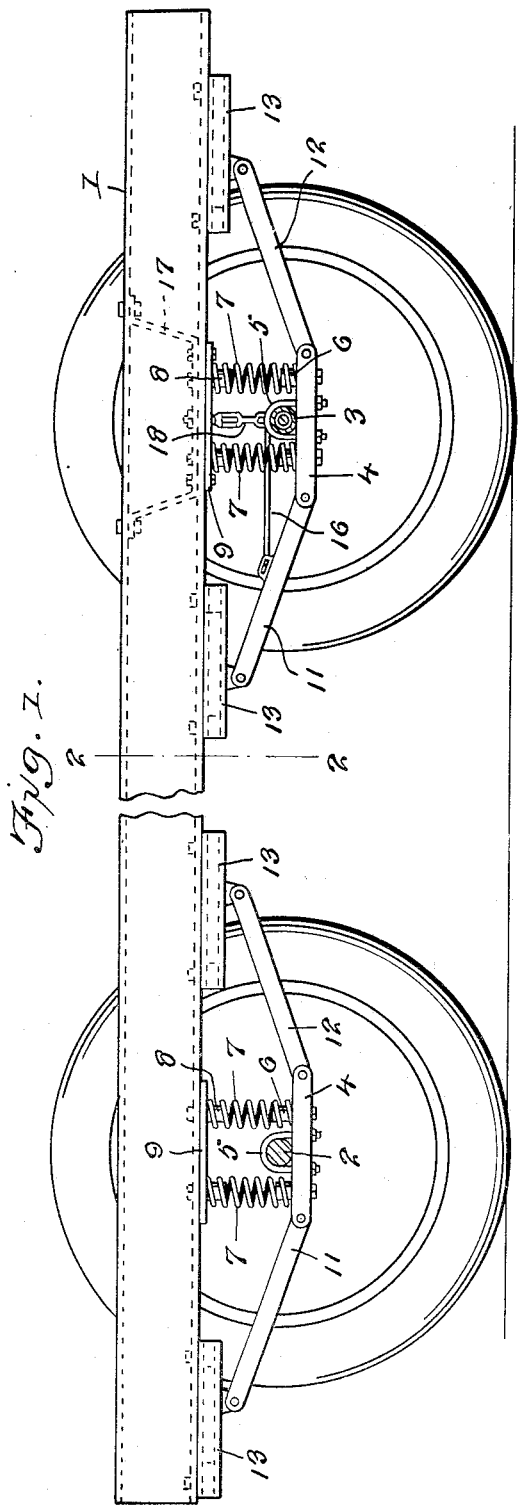
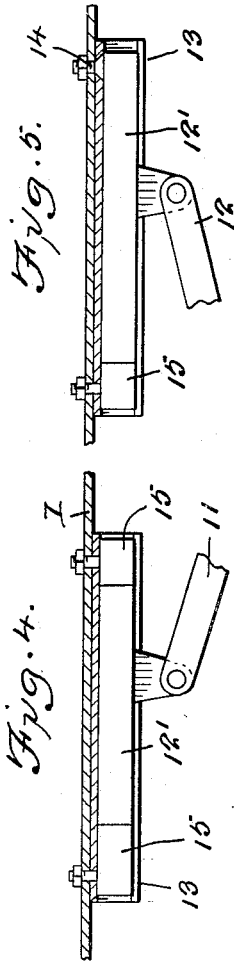
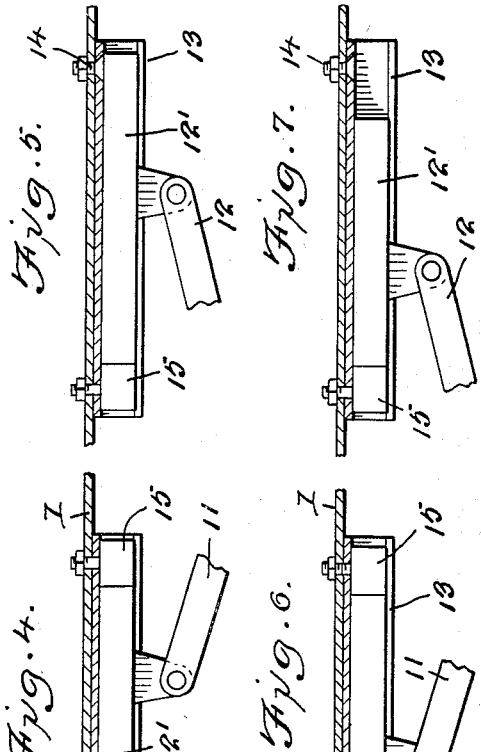
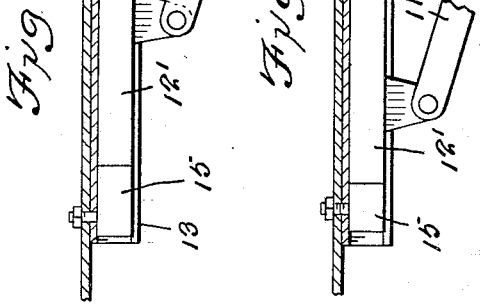
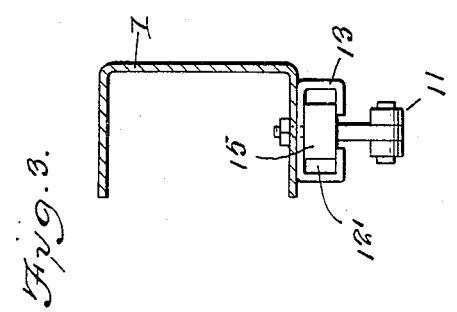
Lewys A. Coleman
INVENTOR
BY Victor J. Evans & Co.
ATTORNEY

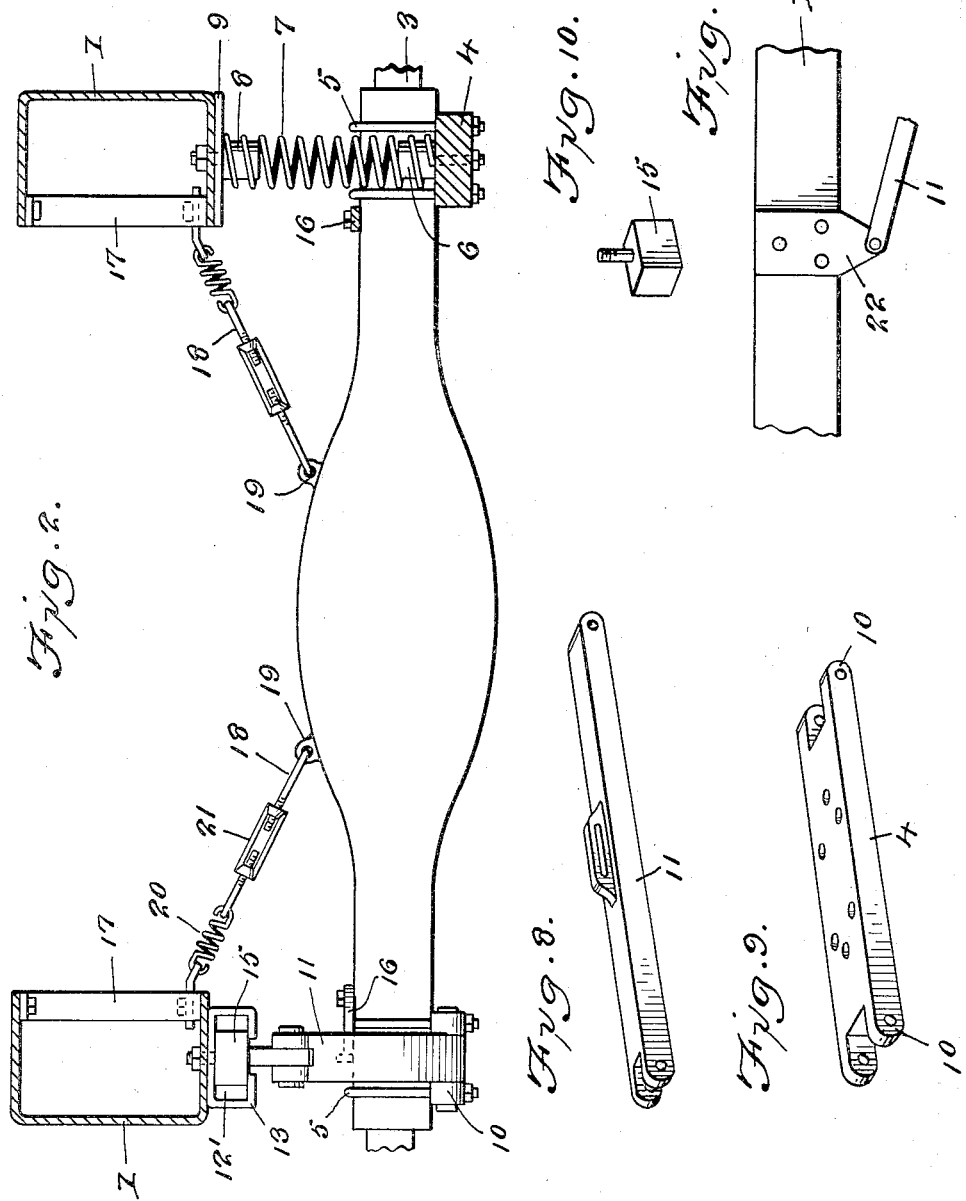

Patented Oct. 31, 1933

1,933,162

UNITED STATES PATENT OFFICE 1,933,162

CHASSIS SUPPORT

Lewis A. Coleman, Portsmouth, Va.

Application December 14, 1932. Serial No. 647,259

2 Claims. (Cl. 267—60)

This invention relates to chassis supports for motor vehicles, and more particularly to a cushioning means and mountings therefor and has for the primary object, the provision of a device of the above stated character which will be durable and simple in construction and provides maximum flexibility and shock absorbing qualities with minimum sway of the vehicle body when passing over uneven ground.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating a chassis support constructed in accordance with my invention.

Figure 2 is a transverse sectional view taken on the line 2—2 of Figure 1.

Figure 3 is a detail sectional view illustrating a slidable mounting for one of the braces.

Figure 4 is a detail sectional view illustrating the head of the mounting occupying one of its positions.

Figure 5 is a similar view illustrating the companion head to that shown in Figure 4.

Figure 6 is a similar view illustrating the same head as shown in Figure 4 occupying another position.

Figure 7 is a similar view showing the position occupied by the head which is a companion to that shown in Figure 6.

Figure 8 is a perspective view illustrating one of the braces.

Figure 9 is a perspective view illustrating one of the spring seats.

Figure 10 is a perspective view illustrating the combined stop and securing element.

Figure 11 illustrates a slight modification wherein the brace is only pivoted to the chassis and is held against sliding movement.

Referring in detail to the drawings, the numeral 1 indicates a frame of a motor vehicle chassis with the front and rear axles indicated by the characters 2 and 3, respectively. Spring seats 4 are secured to the axles 2 and 3 by U-clamps 5 and each has secured thereto spring guides 6 arranged at opposite sides of the respective axle and on which are mounted the lower ends of coil springs 7, the upper ends of said springs engaging spring guides 8 secured to attaching plates 9, bolted or otherwise secured to the frame 1.

Spaced ears 10 are formed on the ends of the spring seats 4 and have pivoted thereto braces 11 and 12 forwardly and rearwardly of the respective axles. Heads 12' are pivoted to the braces and are slidable within guides or casings 13 secured to the frame 1 by bolts or like fasteners 14. One fastener of each casing or guide 13 has an enlarged body 15 forming a stop to limit the movement of the head 12' of the respective guide in one direction. The chassis when traveling over uneven ground, shocks and jars will be absorbed by the springs 7 and thereby be prevented from being transmitted through the frame. During the expansion and contraction of the springs to absorb the shocks and jars the heads 12' slide within their respective guides.

Torque rods 16 are secured to the rear axle 3 adjacent the spring seats 4 and are pivotally and slidably connected to the forward braces 11 of the rear axle. The forward ends of the rods 16 have a limited sliding movement with respect to their respective braces 11 sufficient to compensate for the tilting of the rear axle 3 during the operation of the vehicle.

The side members of the frame 1, directly over the rear axle are strengthened by braces 17 to which are connected tie rods 18, the inner ends of which are pivoted to the rear axle housing, as shown at 19. Each tie rod 18 includes a coil spring 20 and a turn buckle 21 whereby the tie rod may be adjusted to meet different requirements.

Instead of pivoting the braces 11 to slidable heads 12', they may be pivoted to a bracket 22 fixed to the frame 1, as shown in Figure 11.

While I have shown and described the preferred embodiment of my invention, it will be understood that minor changes in construction, combination and arrangement of parts may be made without departing from the spirit and scope of my invention, as claimed.

Having described the invention, I claim:

1. A chassis support including a frame and an axle, spring seats secured to said axle, springs between the frame and seats, forwardly and rearwardly extending braces pivoted to the seats and pivotally and slidably connected to the frame, and torque rods secured to the axle and pivotally and slidably connected to the forward braces.

2. A chassis support including a frame and an axle, spring seats secured to said axle, springs between the frame and seats, forwardly and rearwardly extending braces pivoted to the seats and pivotally and slidably connected to the frame, and torque rods secured to the axles and pivotally and slidably connected to the forward braces, and yieldable and adjustable stay braces between the frame and the axle.

LEWIS A. COLEMAN.